LEWIS T. NEWELL.
Coal-Sifters.

No. 127,703.                                      Patented June 11, 1872.

Witnesses
Alex. Selkirk
Charles Selkirk

Inventor
Lewis T. Newell.

UNITED STATES PATENT OFFICE.

LEWIS T. NEWELL, OF GENEVA, OHIO.

IMPROVEMENT IN COAL-SIFTERS.

Specification forming part of Letters Patent No. 127,703, dated June 11, 1872.

*To all whom it may concern:*

Figure 1:
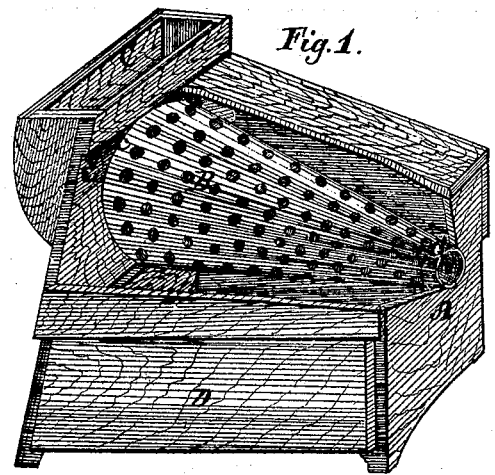
Figure 2:
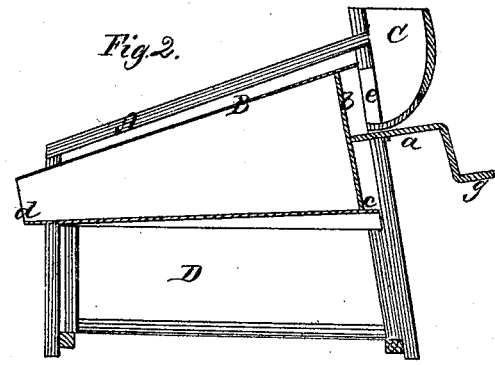
Figure 3:
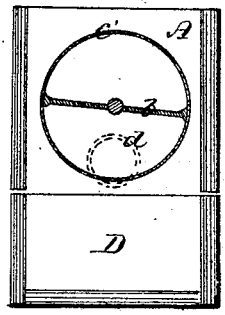
Figure 4:
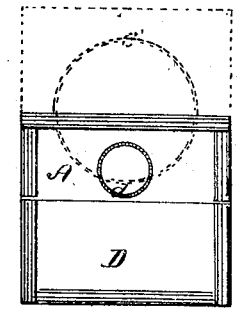

Be it known that I, LEWIS T. NEWELL, of Geneva, State of Ohio, have invented certain new and useful Improvements in Sifters for Ashes, Coal, and the like, of which the following is a specification:

Figure 1 represents a perspective view of the invention with part of the box broken away. Fig. 2 is a side elevation embodying my invention. Fig. 3 is an end view through line No. 1, Fig. 2. Fig. 4 is an end view through line No. 2, Fig. 2.

In the drawing, A represents a box of suitable form and dimensions to contain the sieve B. The sieve B is made of perforated sheet material or wire, and is cone-shaped in form. The said sieve is placed in the box A in such a manner that its lower surface-line will be horizontal, or a little inclined therefrom, at its smallest end, from such horizontal line, as shown in Figs. 2, 3, and 4. $a$ is a shaft having its bearing in one end of the box A, and is made with or attached to the cross-head or bar $b$, Figs. 1 and 2, which cross-head is attached to the mouth or largest end $c$ of the sieve B, while the smaller end $d$ of the sieve acts or serves itself as a shaft to support the same, and has its bearing in the other end of the box A. C is the hopper or feed-box which leads into the opening $e$, Figs. 1 and 2, and into the mouth of the sieve. The said opening may be provided with a cover to close the same, if desired. When the ashes or other material is placed in the said hopper C, it (the ashes or other material) slides down and the lumps or mixed parts will be broken and loosened by means of the cross-head or bar $b$ acting with the edge of the opening $e$ upon such mixed mass or lumps.

To operate with this invention, the ashes, coal, or other material to be acted upon is placed in the hopper C. The operator turns the crank $g$, Fig. 2, and revolves the said sieve, when the material in the hopper C works down into the mouth of the sieve, and, while the finer and smaller portions will fall therefrom through the perforations or meshes of the said sieve, the larger portions or lumps will be gradually carried along and be discharged from the unobstructed end $d$ into any vessel that may be placed beneath the same. Should any lumps of mixed material pass from the hopper C into the mouth $c$ of the sieve, such lumps will be broken up by the contact of cross-bar $b$ and the edge of the opening $e$ with such lumps or mass.

I am aware that sieves of circular form have been used to screen coal and other material; but they have generally been cylindrical in form, and not cone-shaped, and have had a shaft passing through the same in its center. Such sieves I do not claim; neither do I claim the box or draw D, Figs. 1, 2, and 3, which may be used to receive the finer portions of the material sifted or screened.

What I claim as my invention, and desire to secure by Letters Patent, is—

The cone-shaped sieve B, constructed and arranged within the box A and supported within the said box, by means of the shaft $a$, and smaller end $d$ of the said sieve, as shown and for the purpose set forth.

LEWIS T. NEWELL.

Witnesses:
ALEX. SELKIRK,
CHARLES SELKIRK.